United States Patent [19]

Nakaoka

[11] 4,414,470
[45] Nov. 8, 1983

[54] PUPIL DIVISIONAL FOCUSING POSITION DETECTION APPARATUS USING LENTICULA LENS

[75] Inventor: Hideo Nakaoka, Tokyo, Japan

[73] Assignee: Ricoh Company, Ltd., Tokyo, Japan

[21] Appl. No.: 117,818

[22] Filed: Feb. 1, 1980

[30] Foreign Application Priority Data

Feb. 8, 1979 [JP] Japan .................................. 54-13655
Feb. 8, 1979 [JP] Japan .................................. 54-13656

[51] Int. Cl.³ .......................... G03B 3/00; H01J 40/14
[52] U.S. Cl. ........................................ 250/204; 354/25
[58] Field of Search ................ 250/201, 204, 558; 356/4, 12; 350/167; 352/57, 60, 62; 353/7; 354/25 R, 25 N, 31 F; 355/22; 358/88–92

[56] References Cited

U.S. PATENT DOCUMENTS

| | | | |
|---|---|---|---|
| 2,876,099 | 3/1959 | Schenk | 350/167 |
| 4,071,297 | 1/1978 | Leitz et al. | 356/4 |
| 4,185,191 | 1/1980 | Stauffer | 250/204 |
| 4,230,941 | 10/1980 | Stauffer | 250/204 |

*Primary Examiner*—David C. Nelms
*Assistant Examiner*—Edward P. Westin
*Attorney, Agent, or Firm*—Wyatt, Gerber, Shoup, Scobey & Badie

[57] ABSTRACT

In a focusing position detection apparatus for detecting a focusing position by causing rays of light coming from a peripheral portion of an exit pupil of a photographing lens to enter a pair of self-scanning type photoelectric element arrays through a lenticular lens group and then detecting the difference of the phases of the output signals from the photoelectric element arrays, in order to cause the rays of light to enter accurately the pair of self-scanning type photoelectric element arrays, a pitch Po between photoelectric elements which constitute the pair of photoelectric element arrays is suitably changed relative to a pitch P between small lens element which constitute the lenticular lens group, and furthermore, in order to detect the focusing position accurately, the boundary areas in the convex surfaces of the small lens elements of the lenticular lens group are made opaque so that noises in the output signals of the photoelectric element arrays are reduced.

12 Claims, 14 Drawing Figures

PUPIL DIVISIONAL FOCUSING POSITION DETECTION APPARATUS USING LENTICULA LENS

BACKGROUND OF THE INVENTION

The present invention relates to an electronic focusing position detection apparatus for detecting a focusing position in cameras and the like.

Conventionally, there is known a focusing position detection apparatus utilizing a photoelectric element whose resistance becomes maximum when the image of an object is focused on the photoelectric element. In another conventional focusing position detection apparatus, double images of the object are respectively projected onto different photoelectric elements and the difference between the electric currents which flow through the respective photoelectric element is measured and when the image of the object is focused, the difference of the photoelectric currents becomes minimum.

In these focusing position detection apparatuses, the focusing position itself can be determined. However, when the object is out of focus, it cannot be determined whether the focused position is in front of the film surface (hereafter referred to as a front focusing state) or the focused position is behind the film surface (referred to as a back focusing state). Therefore, in these apparatuses, it is required that a prescanning be initiated from a predetermined direction, for example, from close range to infinite range so that the focusing position is searched and detected and then the photographing lens is moved to the detected focusing position. This prescanning step, however, is laborious.

Furthermore, in this type of the focusing position detection apparatuses a lenticular lens group consisting of a number of small lens elements is used and the small lens elements are adjacent each other and are made integrally, and near the boundary areas of a convex surface of each small lens element, each lens element has a radius of curvature which is different from a predetermined radius of curvature or has a reversed radius of curvature in a certain range. Therefore, although all the rays of light which enter one small lens element have to enter its counterpart photoelectric element, some of the rays of light are refracted in the boundary areas in different directions and enter the other photoelectric elements, so that noises are produced in the output signals from the photoelectric elements. As a result, the exact focusing position cannot be detected.

SUMMARY OF THE INVENTION

It is an object of the invention to provide a focusing position detection apparatus which does not require a laborious prescanning step for searching and detecting the focusing position.

Another object of the invention is to provide a focusing position detection apparatus capable of performing the focusing detection accurately by preventing the rays of light from passing through the boundary areas in the convex surfaces of the small lens elements of a lenticular lens group having photoelectric element arrays for detecting the focusing position.

According to the invention, a focusing position is detected by causing rays of light from a peripheral portion of an exit pupil of a photographing lens to enter a pair of self-scanning type photoelectric element arrays through a lenticular lens group and then detecting the difference of the phases of the output signals from the photoelectric element arrays, and the pitch Po between photoelectric elements which constitute the pair of photoelectric element arrays or the pitch P between small lens elements which constitute the lenticular lens group is determined so as to maintain a relationship of Po=W P/D, wherein D is the distance between the exit pupil of the photographing lens and the center of curvature of a small lens element on the optical axis of the photographing lens, and W is the distance between the center of curvature of the small lens element on the optical axis and a plane on which the photoelectric element arrays are disposed.

Furthermore, according to the invention, the boundary areas of the convex lens surfaces of the lenticular lens group are made opaque by filling in or applying a light absorbing material to the boundary areas.

DESCRIPTION OF THE PREFERRED EMBODIMENTS

Figure 1:
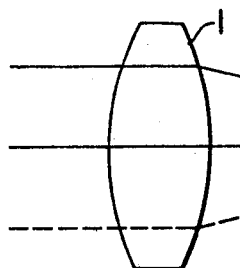
FIG. 1 schematically shows a focusing state of a pupil divisional type focusing position detection apparatus to which the invention can be applied.
Figure 2:
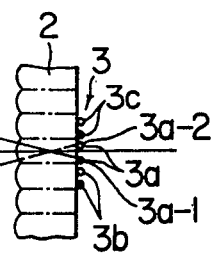
FIG. 2 shows the phases of the output signals of the photoelectric element arrays in the focusing state in FIG. 1.
Figure 3:
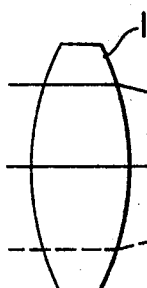
FIG. 3 schematically shows a front focusing state of the pupil divisional type focusing position detection apparatus of FIG. 1.

Referring to FIG. 1, there is schematically shown a focusing state of a pupil divisional type focusing position detection apparatus to which the invention can be applied.

Figure 4:
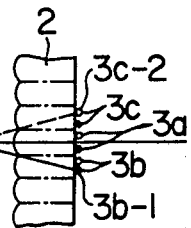
FIG. 4 shows the phases of the output signals of the photoelectric element arrays in the front focusing state in FIG. 3.
Figure 5:
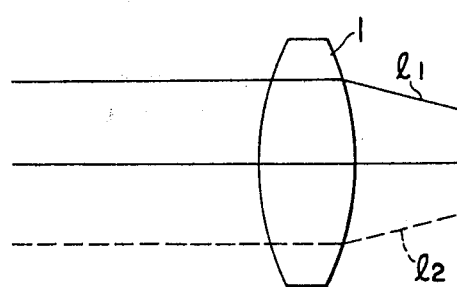
FIG. 5 schematically shows a back focusing state of the pupil divisional type focusing position detection apparatus of FIG. 1.
Figure 6:
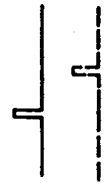
FIG. 6 shows the phases of the output signals of the photoelectric element arrays in the back focusing state in FIG. 5.

As shown in FIG. 1, rays of light are caused to enter a pair of self-scanning type photoelectric element arrays 3, such as CCD (Charge Coupled Device) type image sensors and MOS type image sensors, from a peripheral portion of an exit pupil of a photographing lens 1 through a group of small lenses or a lenticular lens group 2, such as lenticular lenses, so that the focusing position is detected from the difference of the phases of the output signals of the photoelectric element arrays 3. This type of the focusing position detection apparatus is referred to as a pupil divisional type focusing position detection apparatus since rays of light coming from two-divided portions of a photographing lens are utilized in detecting the focusing position. The focusing position is detected as follows: When the image of an object is in the focusing state as shown in FIG. 1, the divisional rays of light correctly enter a pair of photoelectric elements 3a-1 and 3a-2 from the photographic lens 1. Therefore, the phases of the outputs of the respective photoelectric elements 3a-1, 3a-2 are in agreement with each other. When the image is focused in front of the focusing plane, that is, in the so-called front focusing state, the divisional rays of light from the photographing lens 1 respectively enter another pair of photoelectric elements 3b-1, 3c-2, so that the phases of the output signals of the pair of the photoelectric elements 3b-1, 3c-2 are shifted from each other as shown in FIG. 4. On the other hand, in the case of a back focusing state as shown in FIG. 5, a divisional rays of light $l_1$ enters a photoelectric element 3c-2, which is indicated by a blank block, although, in the focusing state, the divisional rays of light $l_1$ should enter the photoelectric element 3a-1, which is indicated by a solid black block in FIG. 5. Furthermore, in the back focusing state, another divisional ray of light $l_2$ enters the photoelectric element 3b-1, which is indicated by a solid black block. As a result, the phases of the output signals of the photoelectric elements 3c-2, 3b-1 are reversed as shown in FIG. 6 in contrast with the case in FIG. 4. Thus, by detecting the difference of the phases of the output signals of the photoelectric elements, it can be determined whether the image of an object is in the focusing state, in the front focusing state or in the back focusing state.

Figure 7:
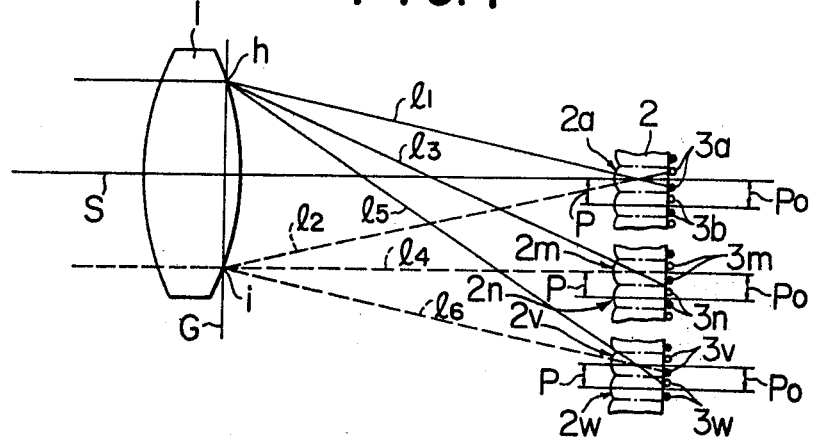
FIG. 7 shows the shortcomings of the pupil divisional type focusing position detection apparatus of FIG. 1.
Figure 8:
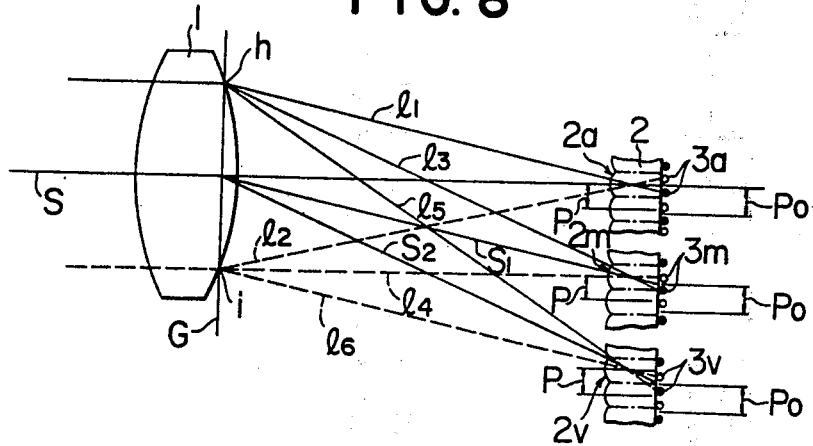
FIG. 8 schematically shows another pupil divisional type focusing position detection apparatus according to the invention.

In this type of the focusing position detection apparatus, each pair of photoelectric elements 3a, 3b, . . . is disposed so as to correspond with each lens element which constitutes a lenticular lens group 2. Therefore, a pitch Po between each pair of photoelectric elements is equal to a pitch P between the lens elements. In this construction, the rays of light, $l_1$ and $l_2$, which come from points h and i on the exit pupil plane G of the photographing lens 1 converge on the optical axis S of the photographing lens 1 (FIGS. 7, 8) and enter a pair of photoelectric elements 3a corresponding to a small lens element 2a. However, rays of light which deviate from the optical axis S, for example, $l_3$ and $l_4$, do not enter any of a pair of photoelectric elements 3m corresponding to a small lens element 2m. Furthermore, in contrast with the rays of light $l_1$ and $l_3$, rays of light $l_5$ and $l_6$, enter in reverse order one of a pair of photoelectric elements 3v corresponding to small lens element 2v and one of a pair of photoelectric elements 3w corresponding to a small lens element 2w, which is located adjacent the one photoelectric element 3v. Thus, the focusing position to be indicated by each pair of the photoelectric elements becomes more inaccurate as it goes away from the optical axis S.

In the invention, in order that rays of light, $l_1$-$l_6$, coming from points h and i on the exit pupil plane G of the photographing lens 1 enter correctly their corresponding pairs of photoelectric elements, the pitch Po between the photoelectric element pairs is suitably changed relative to the pitch P between the small lens elements, so that each pair of the photoelectric elements is apparently made not to correspond to each lens element except that on the optical axis S. However, each pair of the photoelectric elements comes to substantially correspond to each lens element with respect to the neutral lines of the rays of light from the points h and i on the exit pupil plane G, for example, neutral lines $S_1$ and $S_2$ in FIG. 8.

Figure 9:
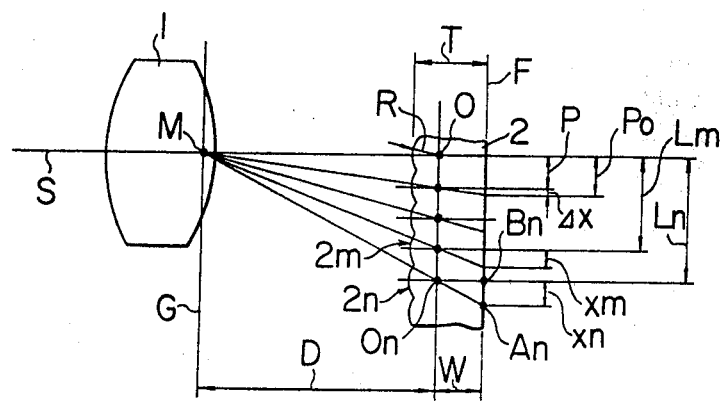
FIGS. 9 and 10 show how to determine a pitch between the photoelectric elements in the invention.

The pitch Po between the photoelectric elements is determined as follows: Referring to FIG. 9, the exit pupil plane G of the photographing lens 1 and the optical axis S of the photographing lens 1 intersect at M, and the distance along the optical axis S between the exit pupil plane G and the center of curvature O of each lens element of the lenticular lens group 2 is D, and the distance along the optical axis S between the center of curvature O and an attachment plane F for attaching each pair of the photoelectric elements thereto is W.

In a construction using the lenticular lens group 2 with its convex side directed to the photographing lens 2, the photoelectric element attachment plane F is on the back side of the lenticular lens group 2 and therefore the distance W is equal to T-R, wherein T is the thickness of the lenticular lens group and R is the radius of curvature of each lens element of the lenticular lens group 2.

When the center of curvature of a n th small lens element 2n counted from the optical axis S is $O_n$ and the distance between the optical axis S and the center of curvature $O_n$ is $L_n$, and $A_n$ is a cross point of a neutral line $MO_n$ and the attachment plane F, that is, the center of a pair of the photoelectric elements which belong to the small lens element 2n, and $B_n$ is a cross point of the attachment plane F and a pitch line with respect to the small lens element 2n, that is, a line parallel to the optical axis S, which passes through the center of curvature $O_n$, the distance $X_n$ between the point $A_n$ and the point $B_n$ is represented as follows:

$$X_n = W \frac{L_n}{D} \qquad (1)$$

$X_n$ is the summation of the variation of the pitch Po between the pairs of the photoelectric elements corresponding to the summation of the pitch P between the small lens elements in the range from the optical axis S to the small lens element $2_n$. A summation $X_m$ of the variation of the pitch Po between the pairs of the photoelectric elements up to a small lens element $2_m$, which is located adjacent the small lens element $2_n$ and nearer the optical axis S, is represented as follows:

$$X_m = W \frac{L_m}{D} = W \frac{L_n - P}{D} \qquad (2)$$

Therefore, the change $\Delta X$ of the pitch Po of the pair of the photoelectric elements corresponding to the one pitch between the small lens elements is $$\Delta X = X_n - X_m \qquad (3)$$

$$= W\frac{Ln}{D} - W\frac{Ln - P}{D} = W\left(\frac{Ln - (Ln - P)}{D}\right)$$

$$= W\frac{P}{D}$$

Therefore, the pitch Po between the photoelectric elements is $$Po = P + \Delta X = P + W\frac{P}{D} \qquad (4)$$

As mentioned previously, since $W = T - R$, Equation (4) can be rewritten as follows:

$$Po = P + (T - R)\frac{P}{D} \qquad (5)$$

By determining the pitch Po between the photoelectric elements in accordance with the thus determined pitch Po, the rays of light from each divided area of the photographing lens 1 correctly enter the corresponding pairs of photoelectric elements, so that the correct output signals are produced from the pairs of the photoelectric elements.

Figure 10:
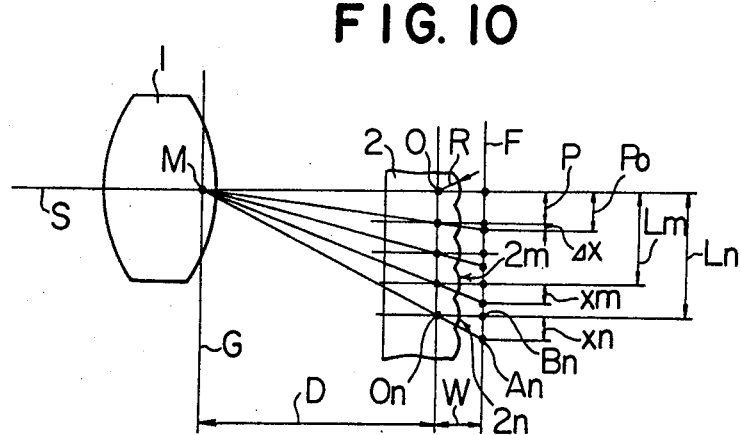

Referring to FIG. 10, there is shown a construction in which the convex side of the lenticular lens group 2 is reversed with respect to the photographing lens 1. In this construction, the photoelectric element attachment surface F is located away from the surface of the lenticular lens group 2. However, when the distance D between the exit pupil plane G of the photographing lens 1 and the center of curvature O of each lens element of the lenticular lens group 2, the distance W from the center of curvature O to the photoelectric element attachment surface F and the other factors are set as in the case of FIG. 9, the relationship between the pitch Po between the photoelectric elements and the pitch P between the small lens elements can be represented by the same equation as Equation (4).

Figure 11:
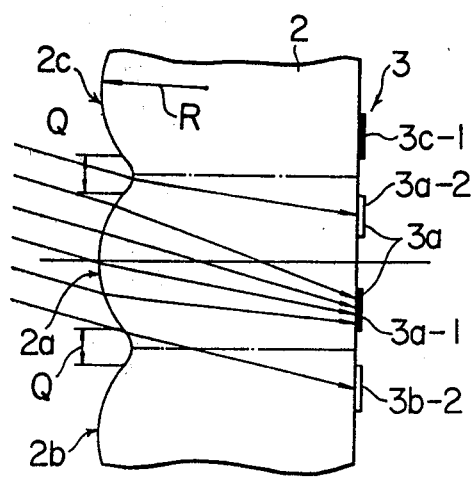
FIG. 11 shows schematically an arrangement of a lenticular lens group and photoelectric element arrays for use in the invention.

Therefore, in this invention, the pitch Po between the photoelectric elements can be determined from a predetermined pitch P between the small lens elements and in reverse order, a pitch P can be determined from a predetermined pitch Po. This is useful when a photoelectric element pair array is made using a commercially available lenticular lens group and also when a lenticular lens group is made using a commercially available photoelectric element pair array. The lenticular lens group for use in this sort of the focusing position detection apparatus consists of a number of small lenses which are adjacent each other and are made integrally. As shown in FIG. 11, near the boundary areas of the convex surface of each lens element, the surface of each lens element has a radius of curvature which is different from the predetermined radius of curvature R or has a reversed radius of curvature in a width of Q. Therefore, although all the rays of light which enter the lens element 2a should enter the photoelectric element 3a-1, some of the rays of light are refracted in the boundary areas Q in different directions and enter the other photoelectric elements, producing noises in the output signals of the photoelectric elements and preventing the exact focusing position detection.

Figure 12:
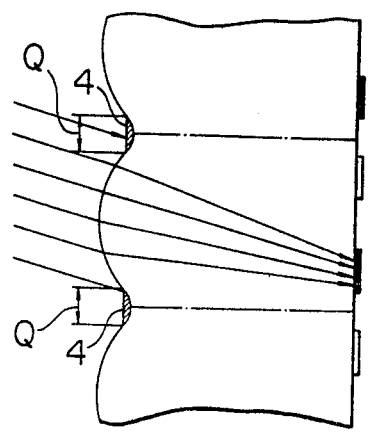
FIG. 12 shows schematically an enlarged section of part of a lenticular lens group of FIG. 11, in which the boundary areas of the convex lens surfaces are made opaque.
Figure 13:
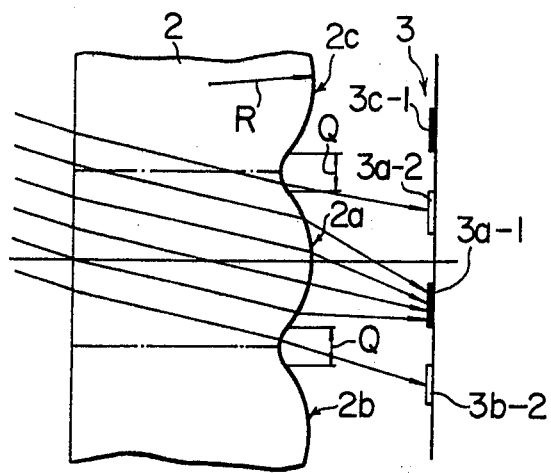
FIG. 13 shows another arrangement of a lenticular lens group and photoelectric element arrays for use in the invention.
Figure 14:
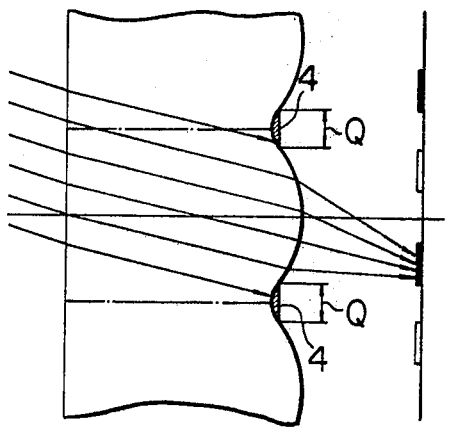
FIG. 14 shows schematically an enlarged section of part of a lenticular lens group of FIG. 13, in which the boundary areas of the convex lens surfaces are made opaque.

This disadvantage can be prevented by making the boundary areas of the lens element opaque. For example, as shown in FIG. 12, a light absorbing material 4 is filled in or applied to the valley portions which constitute the boundary areas Q. As the light absorbing material 4, for example, an epoxy resin with carbon black dispersed therein can be employed. When the light absorbing material 4 is filled in or applied to the valley portions, it must be noted that the other portions of the lens surfaces are not smeared by the light absorbing material 4. In order to fill the light absorbing material 4 more securely, grooves for filling the light absorbing material 4 therein can be formed in the valley portions in the areas Q.

By making the boundary areas Q opaque or light absorbing, the travelling of the rays of light which reach the boundary areas Q is stopped so that generation of the noise signals is prevented.

In this type of the focusing position detection apparatus, the lenticular lens group 2 can be disposed so as to be away from the photoelectric element array 3, with the convex surfaces of the lens group 2 directed to the photoelectric element arrays 3. In this case, the same disadvantage occurs. Namely, although all the rays of light coming from the lens element 2a should enter the corresponding photoelectric element 3a-1, the rays of light coming from the boundary areas Q enter other photoelectric elements, so that the focusing position detection cannot be performed accurately. This disadvantage can also be prevented by filling in or applying the light absorbing material 4 to the valley portions in the boundary areas Q to make the boundary areas Q opaque.

What is claimed is:

1. In a focusing position detection apparatus for detecting a focusing position by causing rays of light coming from a peripheral portion of an exit pupil of a photographing lens to enter a pair of self-scanning type photoelectric element arrays through a lenticular lens group and then detecting the difference of the phases of the output signals from said photoelectric element arrays, the improvement in which the pitch Po between photoelectric elements which constitute said pair of photoelectric element arrays is determined so as to maintain a relationship of $Po = P + WP/D$, wherein P is the pitch between small lens elements which constitute said lenticular lens group, D is the distance between the exit pupil plane of said photographing lens and the center of curvature of a small lens element located on the optical axis of said photographing lens, and W is the distance between the center of curvature of said small lens element on said optical axis and a plane on which said photoelectric element arrays are disposed.

2. A focusing position detection apparatus as in claim 1, in which said lenticular lens group consists of small lens elements, and has a lens surface having convex lens surfaces on one side thereof and a flat surface on the other side thereof.

3. A focusing position detection apparatus as in claim 1, in which said lens surface of said lenticular lens group is directed towards said photographing lens and rays of light coming from the peripheral portion of the exit pupil of said photographing lens are caused to enter said lens surface.

4. A focusing position detection apparatus as in claim 2, in which said flat surface of said lenticular lens is directed towards said photographing lens and rays of light coming from the peripheral portion of the exit pupil of said photographing lens are caused to enter said flat surface.

5. A focusing position detection apparatus as in claim 2, in which the boundary areas of said convex lens surface of said lenticular lens group are made opaque.

6. A focusing position detection apparatus as in claim 5, in which a light absorbing material is filled in or applied to said boundary areas of said convex lens surfaces.

7. In a focusing position detection apparatus for detecting a focusing position by causing rays of light coming from a peripheral portion of an exit pupil of a photographing lens to enter a pair of self-scanning type photoelectric element arrays through a lenticular lens group and then detecting the difference of the phases of the output signals from said photoelectric element arrays, the improvement in which the pitch P between small lens elements which constitute said lenticular lens group is determined so as to maintain a relationship of $Po = P + WP/D$, wherein P. is the pitch between photoelectric elements which constitute said pair of photoelectric element arrays, D is the distance between the exit pupil plane of said photographing lens and the center of curvature of a small lens element located on the optical axis of said photographing lens, and W is the distance between the center of curvature of said small lens element on said optical axis and a plane on which said photoelectric element arrays are disposed.

8. A focusing position detection apparatus as in claim 7, in which said lenticular lens group consists of small lens elements and has a lens surface having convex lens surfaces on one side thereof and a flat surface on the other side thereof.

9. A focusing position detection apparatus as in claim 7, in which said lens surface of said lenticular lens group is directed towards said photographing lens and rays of light coming from the peripheral portion of the exit pupil of said photographing lens are caused to enter said lens surface.

10. A focusing position detection apparatus as in claim 8, in which said flat surface of said lenticular lens is directed towards said photographing lens and rays of light coming from the peripheral portion of the exit pupil of said photographing lens are caused to enter said flat surface.

11. A focusing position detection apparatus as in claim 8, in which the boundary areas of said convex lens surface of said lenticular lens group are made opaque.

12. A focusing position detection apparatus as in claim 11, in which a light absorbing material fills in said boundary areas of said convex lens surfaces.

* * * * *